United States Patent
Bengson

(10) Patent No.: US 7,853,479 B2
(45) Date of Patent: *Dec. 14, 2010

(54) DATA COLLECTION AND DISSEMINATION SYSTEM WITH LITERATURE DISTRIBUTION AND EMAIL FOLLOW-UP

(75) Inventor: Rick Robert Bengson, San Diego, CA (US)

(73) Assignee: Showing Suite, Inc., San Diego, CA (US)

( * ) Notice: Subject to any disclaimer, the term of this patent is extended or adjusted under 35 U.S.C. 154(b) by 1196 days.

This patent is subject to a terminal disclaimer.

(21) Appl. No.: 11/428,609

(22) Filed: Jul. 5, 2006

(65) Prior Publication Data

US 2007/0088618 A1    Apr. 19, 2007

Related U.S. Application Data

(63) Continuation-in-part of application No. 11/408,212, filed on Apr. 20, 2006.

(60) Provisional application No. 60/728,042, filed on Oct. 17, 2005, provisional application No. 60/772,531, filed on Feb. 10, 2006.

(51) Int. Cl.
    *G06Q 30/00* (2006.01)
(52) U.S. Cl. ............... 705/14.56; 705/14.49; 705/14.55
(58) Field of Classification Search ............ 705/14.49, 705/14.55, 14.56, 14.66
    See application file for complete search history.

(56) References Cited

U.S. PATENT DOCUMENTS

| | | | |
|---|---|---|---|
| 3,357,133 A | 12/1967 | Helsing | |
| 4,674,041 A | 6/1987 | Lemon et al. | |
| 4,817,043 A * | 3/1989 | Brown | 715/810 |
| D318,553 S | 7/1991 | Brown | |

(Continued)

FOREIGN PATENT DOCUMENTS

WO    WO 9935600    7/1999

(Continued)

OTHER PUBLICATIONS

Beyaztas, B., "Sainsbury's in Kiosk Offer," Marketing, Mar. 19, 1998.*

(Continued)

*Primary Examiner*—Nicholas D Rosen
(74) *Attorney, Agent, or Firm*—McAndrews, Held & Malloy, Ltd.

(57) ABSTRACT

Certain embodiments of the present invention provide a system for collecting and disseminating customer and agent data, distributing real estate marketing literature, issuing literature vouchers, issuing commission receipts, and sending follow-up emails to solicit feedback data. The system includes a customer terminal, which is in communication with a data center, which, in turn, is in communication with a business terminal. The customer terminal includes a device for inputting customer and agent data and a device for distributing relevant marketing literature and issuing literature vouchers and commission receipts. The customer and agent data is sent to the data center, where it is stored for subsequent retrieval by a salesperson using the business terminal. The data center automatically generates and sends follow-up emails to the customer and agent to solicit feedback data. When the feedback data is received, the data center updates the relevant customer and agent data with the feedback data.

21 Claims, 5 Drawing Sheets

U.S. PATENT DOCUMENTS

| | | | |
|---|---|---|---|
| 5,235,680 A | 8/1993 | Bijnagte | |
| 5,754,850 A | 5/1998 | Janssen | |
| 5,860,362 A * | 1/1999 | Smith | 101/494 |
| 6,123,259 A | 9/2000 | Ogasawara | |
| 6,510,414 B1 * | 1/2003 | Chaves | 704/270 |
| 6,976,032 B1 | 12/2005 | Hull | |
| 7,242,967 B2 * | 7/2007 | Yamakawa et al. | 455/566 |
| 7,617,114 B1 * | 11/2009 | Tooke et al. | 705/2 |
| 2001/0034607 A1 * | 10/2001 | Perschbacher et al. | 705/1 |
| 2002/0161476 A1 * | 10/2002 | Panofsky et al. | 700/231 |
| 2003/0083957 A1 | 5/2003 | Olefson | |
| 2004/0046798 A1 | 3/2004 | Alen | |
| 2005/0002514 A1 * | 1/2005 | Shafiee et al. | 379/265.09 |
| 2005/0021404 A1 * | 1/2005 | Schoder et al. | 705/14 |
| 2005/0114379 A1 * | 5/2005 | Lee | 707/102 |
| 2005/0149406 A1 * | 7/2005 | Bascobert et al. | 705/14 |
| 2005/0160022 A1 * | 7/2005 | Chesney | 705/35 |
| 2005/0200638 A1 * | 9/2005 | Silverbrook et al. | 347/2 |
| 2005/0204378 A1 * | 9/2005 | Gabay | 725/13 |
| 2005/0216347 A1 * | 9/2005 | Williams et al. | 705/14 |
| 2005/0229451 A1 * | 10/2005 | Mullens et al. | 40/500 |
| 2006/0041542 A1 | 2/2006 | Hull | |
| 2006/0075303 A1 * | 4/2006 | Ulrich et al. | 714/38 |
| 2007/0055583 A1 * | 3/2007 | Davis | 705/28 |

FOREIGN PATENT DOCUMENTS

WO  WO-9935600 A2 * 7/1999

OTHER PUBLICATIONS

Byrne, A., "Discovering Ireland is Not Cheap With a [Pounds] 5 Service Charge," Irish Times, City edition, p. 2, Jan. 27, 2001.*

* cited by examiner

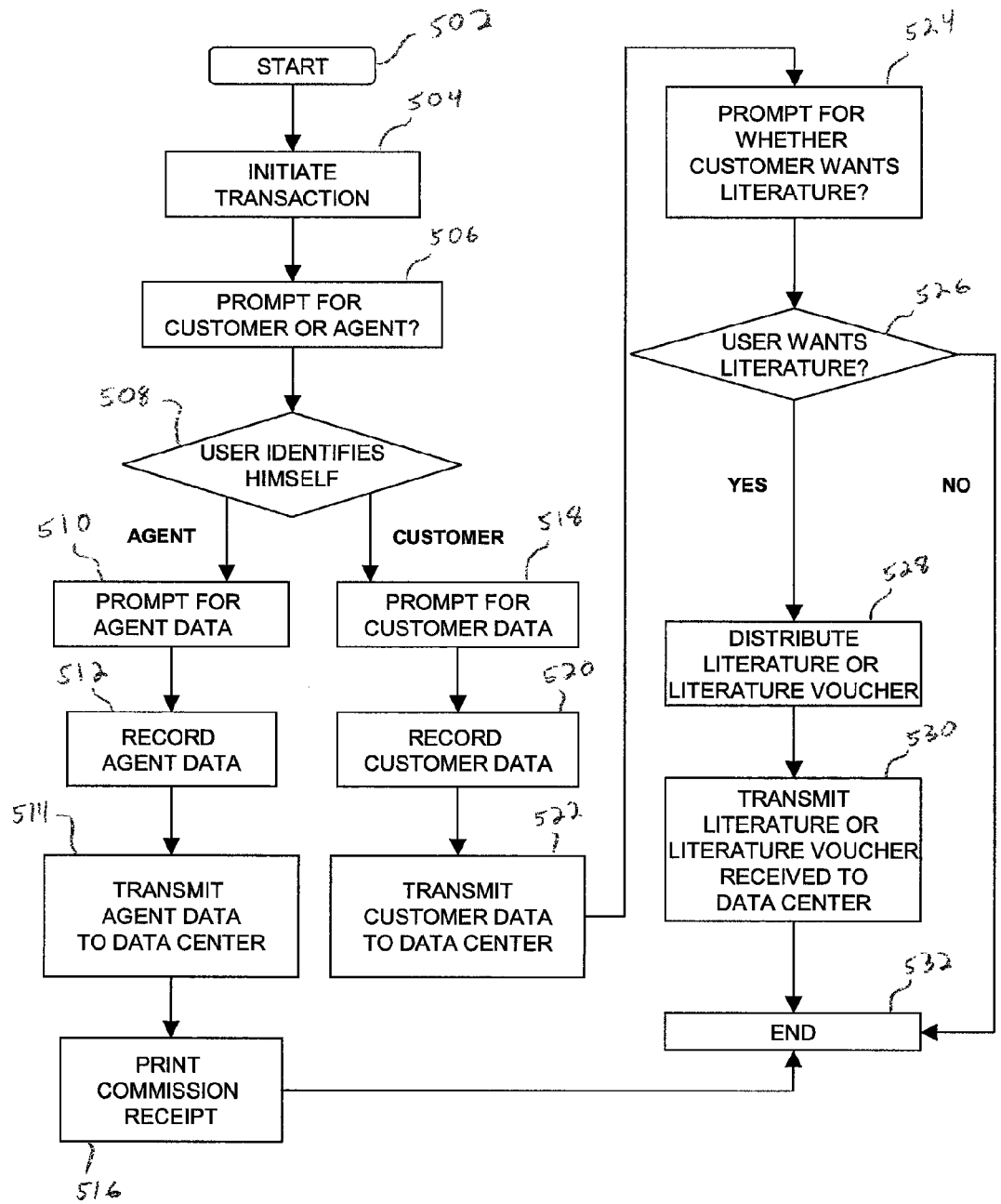

DATA COLLECTION AND DISSEMINATION SYSTEM WITH LITERATURE DISTRIBUTION AND EMAIL FOLLOW-UP

RELATED APPLICATIONS

This application claims priority from Ser. No. 11/408,212, filed Apr. 20, 2006, which claims priority from Ser. No. 60/728,042, filed Oct. 17, 2005, and Ser. No. 60/772,531, filed Feb. 10, 2006. Ser. Nos. 11/408,212, 60/728,042, and 60/772,531 are hereby incorporated by reference.

BACKGROUND OF THE INVENTION

In the field of real estate, and in particular the new home market, there is a need to identify customers that may potentially purchase homes. Such customers—often called "leads"—typically attend an "open house" or a developer's model sales office with the goal of evaluating a property to determine if they want to purchase it. At an open house or developer's model sales office, real estate professionals such as salespeople try to meet each customer personally and, in the process, ascertain customer data such as his name, contact information, price range, and property preferences.

In some instances, model sales offices (or open houses) are so busy that, regardless of the sales staff's efforts, some customers visit the property but are never approached personally. In these situations, a never approached customer may become discouraged because his questions regarding the property are not answered. Moreover, because the promotional materials are expensive to produce (especially for upscale communities), marketing literature (e.g., brochures, pamphlets, flyers, and the like) is rarely left out for pickup. Accordingly, customers often leave a developer's model sales office with little or no information regarding the property and its offerings while the sales staff fails to collect leads.

Even when a sales person has the ability to talk directly with a customer, that customer may prefer not to interface directly with the salesperson. For example, the customer may be intimidated by overly aggressive salespeople; or, the customer may simply want to view the property, retrieve relevant marketing literature, and leave without investing much time.

Additionally, real estate professionals such as salespeople often value feedback from customers and their agents regarding, for example, the model sales office (or open house), the marketing literature, the properties offered, operation of the customer terminal, etc. Follow-up telephone calls, however, are time-consuming and often received as intrusive or annoying.

Thus, a need exists for a system that can—without little or no involvement of a salesperson—collect customer and agent data, provide customers with relevant marketing literature, disseminate the customer and agent data to the sales staff, and follow-up with customers and their agents to solicit feedback.

BRIEF SUMMARY OF THE INVENTION

Certain embodiments of the present invention provide a system for collecting and disseminating customer and agent data, distributing marketing literature, and following-up on potential home buyer leads. The system includes a customer terminal, which is linked (by wire or wirelessly) to a data center, which, in turn, is linked (by wire or wirelessly) to a business terminal. The data center is also linked to the Internet.

A customer can input his customer data into the customer terminal and receive real estate marketing literature dispensed or otherwise made available by the customer terminal. The customer's agent can input his agent data into the customer terminal and receive a commission receipt, which can later be used to show entitlement to a commission should a sale be consummated. The data center receives the customer and agent data from the customer terminal and stores it. A salesperson can operate the business terminal to access the customer and agent data from the data center.

In use, a customer may approach a customer terminal positioned in the lobby of the sales office of a new community and filled with real estate marketing literature related to one or more of the properties being sold within that community. The customer inputs his name, contact information, price range, and purchase criteria. The customer terminal (or data center) then determines which product literature is relevant to the customer, and provides that literature to the customer. Information regarding the customer's name, contact information, price range, purchase criteria, and what literature he was provided is transmitted to the data center. Subsequently, salespeople can use the business terminals to access such information to follow up on the "leads".

Optionally, the customer terminal can be configured to provide the same product literature to all customers. Thus, there would be no need for determining which product literature to provide to a customer.

Optionally, the customer terminal can be configured to issue a voucher for literature instead of literature itself. For example, a customer, after inputting the desired data, can receive a literature voucher from the customer terminal, which he can then present to a salesperson in exchange for literature.

Optionally, a terminal can function as both a customer terminal and a business terminal for use by both customers and salespeople (at different times). Such a terminal can send customer data to the data center and access customer data from the data center.

Optionally, a terminal can function as a customer terminal, business terminal, and data center. Such a terminal can collect customer data from customers and store it locally for later retrieval by salespeople.

Optionally, the customer terminal, data center, or business terminal can send a follow-up email to the customer soliciting feedback regarding, for example, the model sales office (or open house), the marketing literature, the properties offered, operation of the customer terminal, etc.

Optionally, a customer's agent can input data regarding who (which customer) he represents and on what terms and his business contact information into the customer terminal. In such an embodiment, the customer terminal may be configured to issue a commission receipt, documenting which customer the agent purports to represent and documenting the purported commission agreement he has with the customer in case of later dispute. Additionally, the customer terminal, data center, or business terminal can send a follow-up email to the agent soliciting feedback regarding, for example, the model sales office (or open house), the marketing literature, the properties offered, operation of the customer terminal, etc.

BRIEF DESCRIPTION OF SEVERAL VIEWS OF THE DRAWINGS

FIG. 5 illustrates a flowchart of a method of operation of a customer terminal according to an embodiment of the present invention.

DETAILED DESCRIPTION OF THE INVENTION

Figure 1:
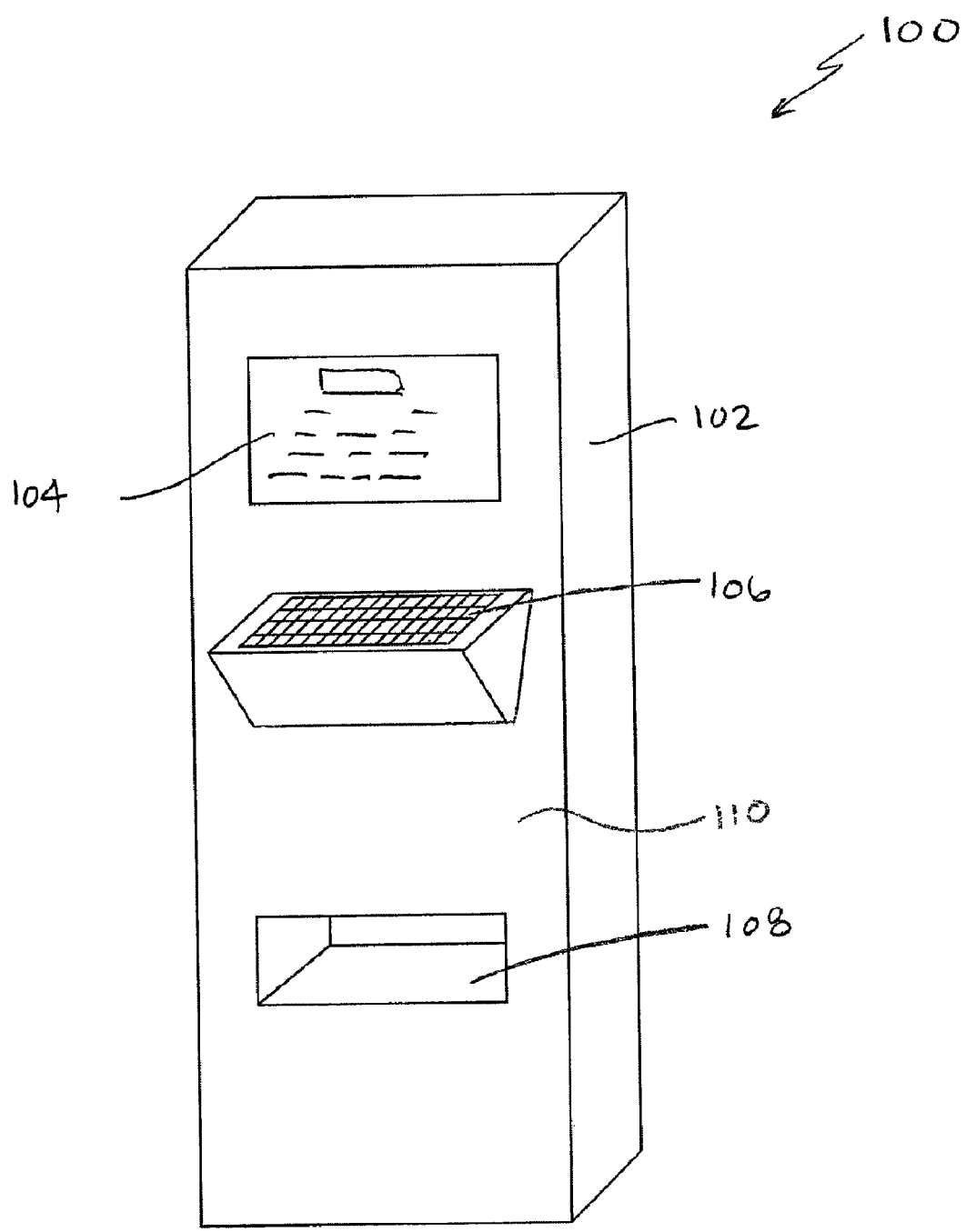
FIG. 1 illustrates a perspective view of a customer terminal according to an embodiment of the present invention.

FIG. 1 illustrates a customer terminal 100 that may be used to collect data from real estate customers (e.g., potential buyers) and distribute to them real estate marketing literature (e.g., brochures, pamphlets, flyers, and the like). The customer terminal 100 includes a chassis 102 that houses a display 104, keyboard 106, and trough 108 along a front surface 110 of the chassis 102. While the chassis 102 is depicted as substantially rectangular, it is to be appreciated that the shape is merely exemplary of a preferred embodiment. The chassis 102 is configured to support the remaining components of the customer terminal 100.

The chassis 102 also houses a controller, memory, and a literature bin that are located fully within the chassis 102 and not illustrated. The literature bin is loaded by an operator (e.g., a developer or salesperson) with marketing literature.

The display 104 may be any known display device capable of displaying information for a customer to view. For example, the display 104 could comprise a video screen employing CRT, LCD, DLP, or LCOS technology; or, also for example, the display 104 could comprise a LED. The display 104 is controlled by the controller in accordance with program software stored in the memory and input received by the keyboard 106.

The trough 108 is configured to receive marketing literature dispensed from the literature bin in response to a customer's input at the keyboard 106.

Figure 2:
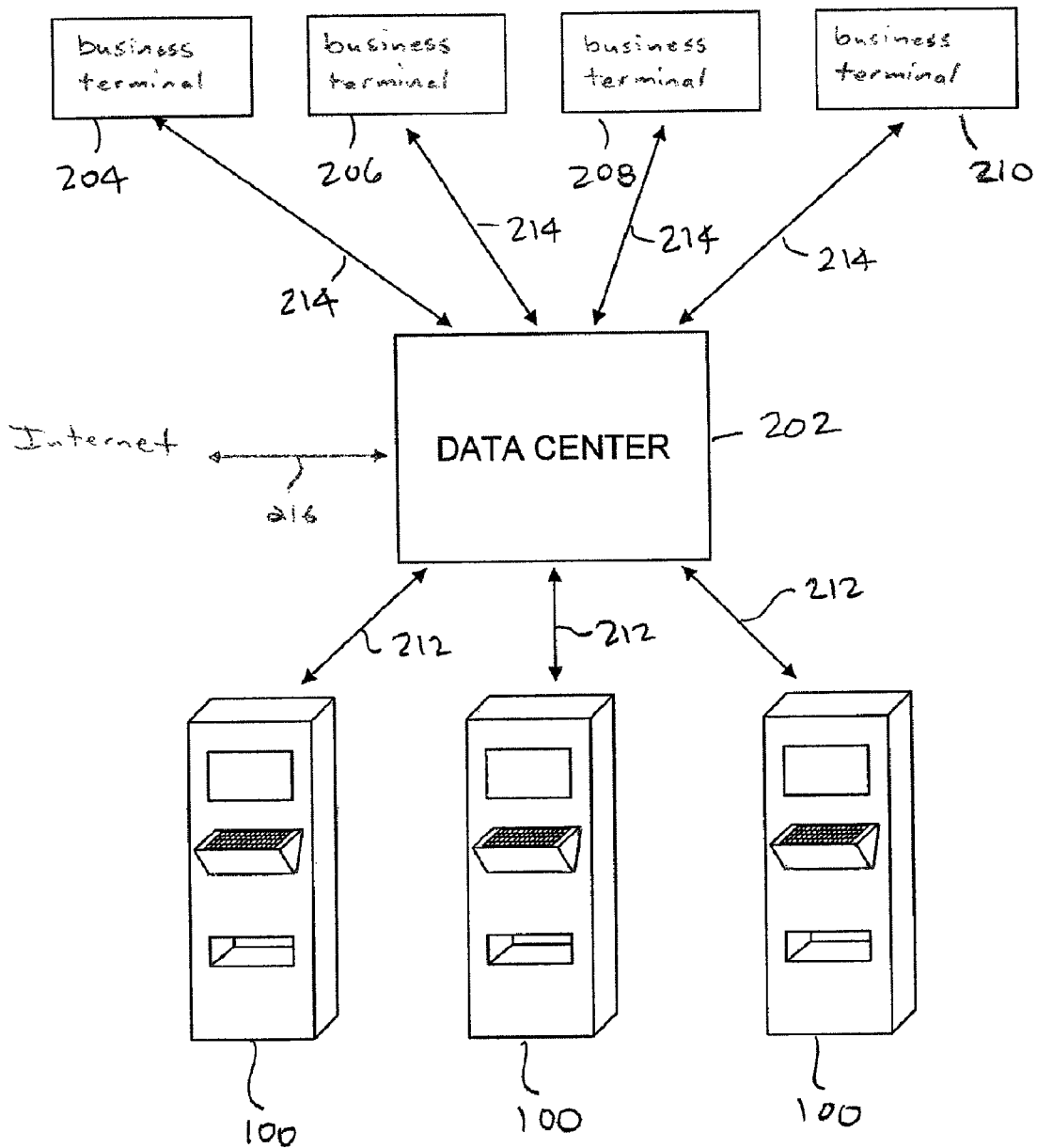
FIG. 2 illustrates a block diagram of a system for collecting and disseminating customer and agent data, for distributing marketing literature, and for following-up on potential home buyer leads according to an embodiment of the present invention.

FIG. 2 illustrates a block diagram of a system 200 for collecting and disseminating customer data and for distributing marketing literature. The system 200 includes a plurality of customer terminals 100 connected to a data center 202 via communication links 212. The communication links 212 may be wired or wireless. A wired communication link 212, for example, could be established through a modem, cable internet connection, direct wired electrical connection, or any other known wired connection. A wireless communication link 212, for example, could be established through a wireless LAN, wireless WAN, cellular communication channel, or any other known wireless connection.

The system 200 also includes a plurality of business terminals 204, 206, 208, and 210 connected to the data center 202 via communication links 214. Like the communication links 212, the communication links 214 may be wired or wireless. Optionally, the business terminals 204, 206, 208, and 210 may be personal computers with Internet access.

The data center 202 is also linked to the Internet via communication link 216, which, like the communication links 212 and 214, may be wired or wireless.

Figure 3:
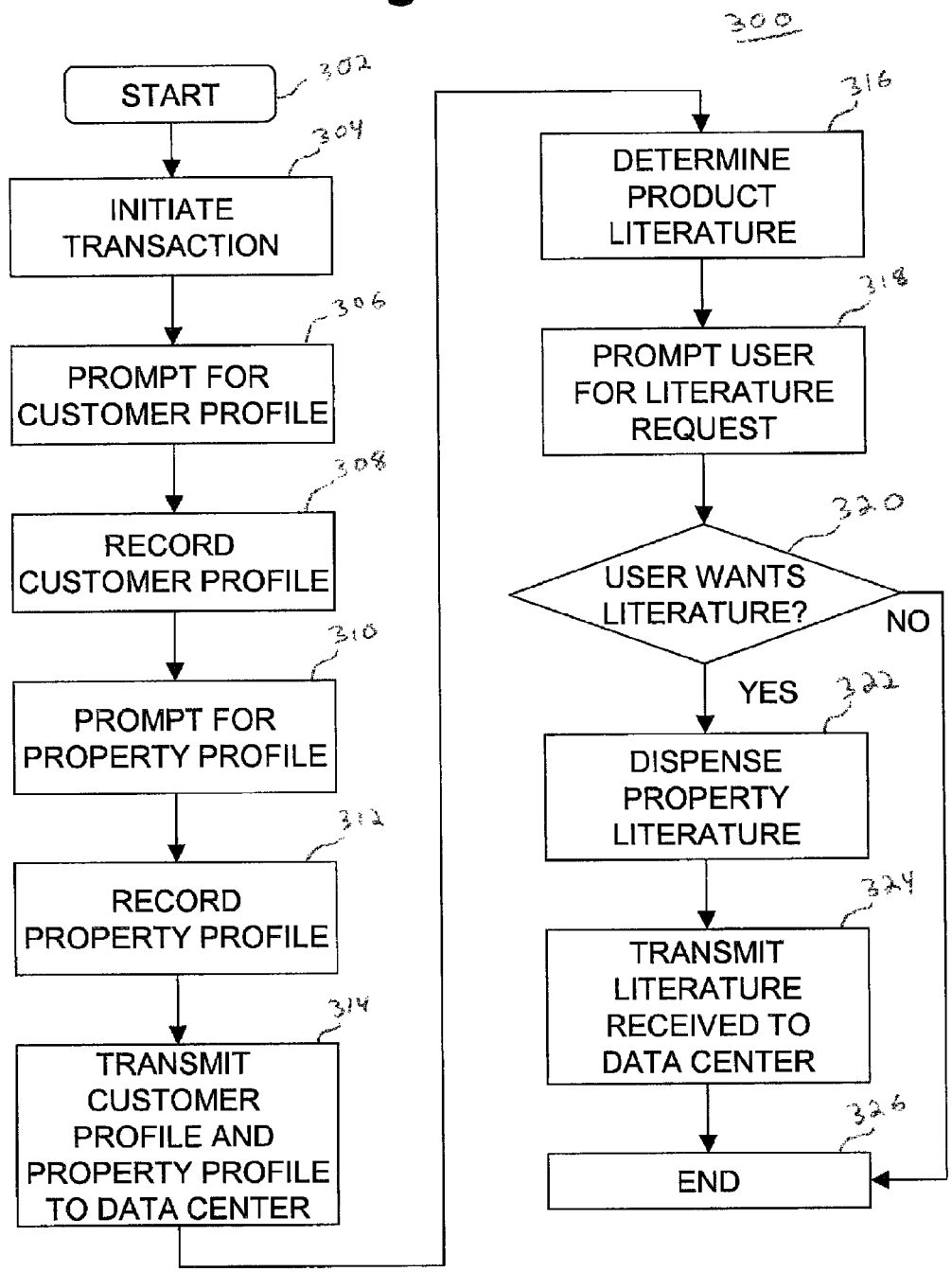
FIG. 3 illustrates a flowchart of a method of operation of a customer terminal according to an embodiment of the present invention.

FIG. 3 illustrates a flowchart of a preferred method of operation 300 of the customer terminal 100. The method 300 comprises a number of steps 302-326 (odd numbers excluded). The method 300 begins and proceeds in response to customer input using the keyboard 106. For example, at step 302, the customer may hit the "enter" button on the keyboard 106 in response to an instruction on a "welcome screen" on the display 104. At step 304, a customer may hit the "y" button in response to whether or not he wishes to initiate a transaction.

Once initiated, the display 104 on the customer terminal 100 prompts the customer to input a customer profile in step 306. The customer profile is then recorded in step 308 to the memory located within the customer terminal 100. Optionally, the customer profile may be immediately transmitted to the data center 202.

The customer profile solicited from, and input by, customers may vary. However, a typical customer profile template (e.g., a questionnaire) and answers thereto may include the following, and may be displayed in a table on the display 104 as follows:

| DATA TYPE | DATA INPUT |
|---|---|
| NAME | John Customer |
| ADDRESS | 2346 Fake St. |
| CITY | SAN DIEGO |
| STATE | CA |
| ZIP CODE | 92118 |
| EMAIL | JOHNCUSTOMER@EMAIL.COM |
| PHONE NO. | (619) 555-9923 |
| HOW DID YOU HEAR ABOUT US? | Internet |
| PROPERTY CRITERIA | 2 BR/2 BA |
| TIME TO PURCHASE | 6 Months |
| PRICE RANGE | $450,000-$600,000 |
| WORKING WITH AN AGENT? | Yes |
| IF SO, WHO? | Joe Broker |
| AGENCY | Roe & Doe Real Estate |
| AGENT PHONE NO. | (858) 555-3456 |

It is to be appreciated that the customer profile template and answers thereto outlined in the table above are merely exemplary. A template for soliciting customer profiles may be custom configured by the operator. For example, the operator can download a custom template from the data center 202 that he previously created and stored to the data center 202. The operator also can modify any template whether using a custom template or a default template.

The software in the customer terminal 100 is preferably synched with the software in the data center 202 so that when a template is modified on the data center 202, the modification(s) will be effective at the customer terminal 100.

After the customer profile is input, the method 300 proceeds to step 310, which prompts the customer to input data regarding properties in which he is interested in order to create a property profile. The property profile may include specific properties, architectural styles, floor plans, models, etc. of which the customer is interested. The property profile is then recorded in step 312 to the memory located within the customer terminal 100.

In step 314, the customer terminal 100 transmits the customer profile and property profile (both of which are generally referred to herein as customer data) to the data center 202. The data center 202 stores the customer data on an internally-located memory (not shown). Additionally, in step 316, the data center 202, through use of an internally-located controller (not shown), analyzes the customer data to determine which pieces of marketing literature the customer terminal 100 should potentially disseminate to the customer.

In step 318, the display 104 asks the customer whether he wants to receive marketing literature. If the customer declines the offer by, for example, pressing button "n" on the keyboard 106, the method 300 proceeds to step 326 and ends.

If the customer accepts the offer by, for example, pressing button "y" on the keyboard 106, the method 300 proceeds to step 322, and the applicable marketing literature is dispensed into the trough 108. The customer can then retrieve the marketing literature from the trough 108.

Optionally, the customer terminal 100 can be configured to dispense the applicable marketing literature only after verifying a portion of the customer profile. For example, the customer terminal 100 (or the data center 202) could send an email to the email address provided to verify that it is a valid email address. If the email address is invalid, the customer terminal 100 (or the data center 202) should receive a "bounced back" email or error message. Thus, the system 200 can be configured to provide for the dispensing of marketing materials only if a "bounced back" email or error message is not received within a certain period of time, such as 5 seconds.

In step 324, the customer terminal 100 informs the data center 202 that the applicable literature was dispensed. The method 300 then ends at step 326.

A short lag time after the method 300 ends, step 302 is automatically activated and the "welcome screen" returns to the display 104.

The customer data that is stored in the data center 202 can be downloaded to, or otherwise accessed by, the business terminals 204, 206, 208, and 210, Thus, salespeople may use the business terminals 204, 206, 208, and 210 to access the customer profiles and property profiles of customers in order to follow up on leads, better identify potential buyers, identify customers that do not have agents, and more efficiently match customers with the properties of their interest.

Optionally, the customer terminal 100 can be configured to issue a literature voucher in lieu of actual literature if the operator so chooses or whenever the literature bin is empty. For example, the literature voucher can be dispensed into the trough 108, and thereafter presented to a salesperson in exchange for actual literature.

Figure 4:
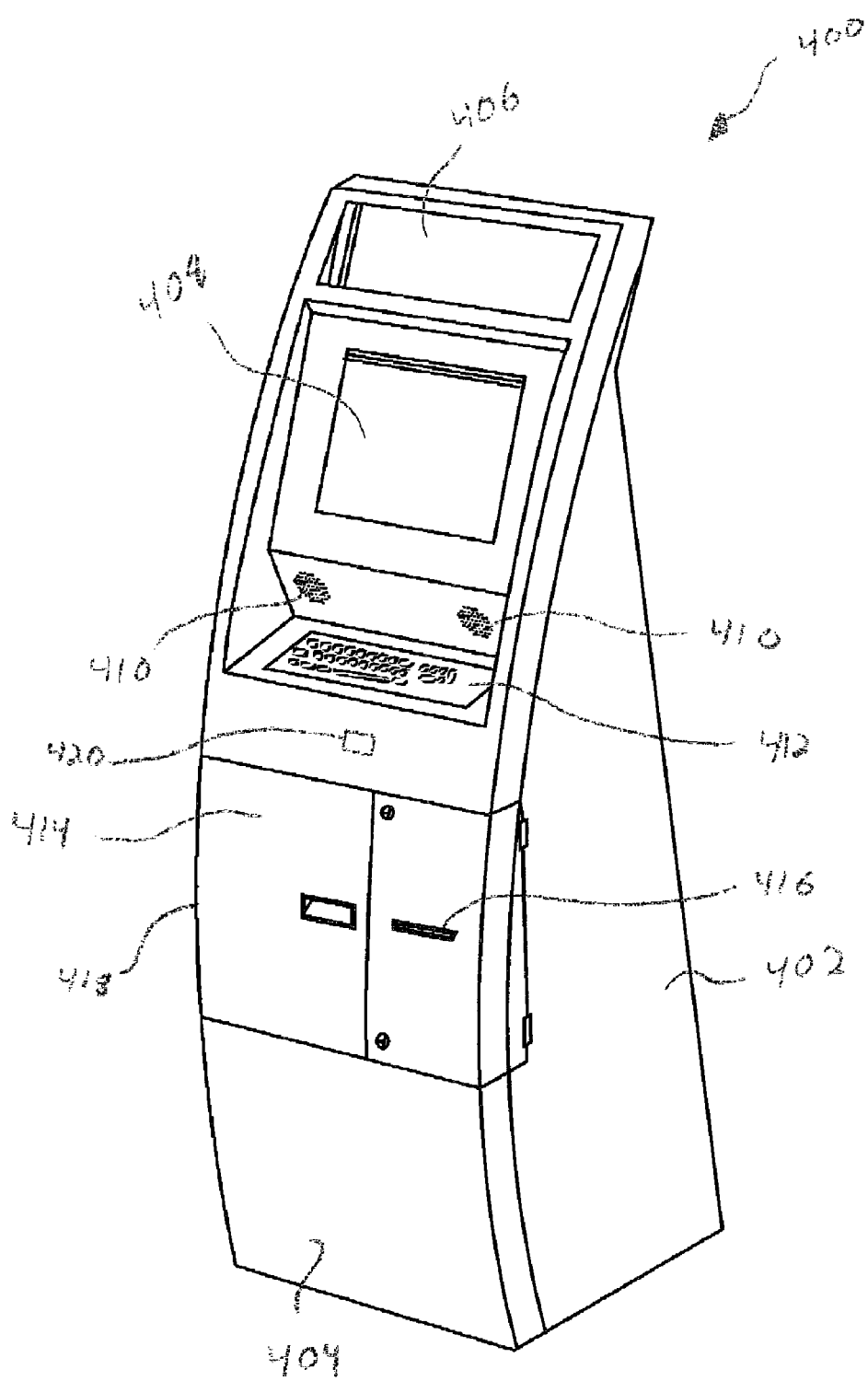
FIG. 4 illustrates a perspective view of an alternative customer terminal according to an embodiment of the present invention.

FIG. 4 illustrates an alternative customer terminal 400 in accordance with an embodiment of the present invention. The customer terminal 400 includes a chassis 402 that has a convex front surface 404. The front surface 404 includes a placard holder 406, a display 408, left and right audio speakers 410, a keyboard 412, a door 414, a printer slot 416, and an indicator light 420.

While the chassis 402 is depicted as having a convex front surface 404, it is to be appreciated that the shape of the chassis 402 is merely exemplary of a preferred embodiment. The chassis 402 is configured to support the other components of the customer terminal 400.

The chassis 402 also houses a controller, memory, literature bin, and printer that are located fully within the chassis 402 and not illustrated. The literature bin is loaded by an operator with marketing literature and is accessible via the door 414, which swings open along hinges (not shown) positioned along a right edge 418 of the front surface 404.

The customer terminal 400 is similar to that of the customer terminal 100 but with some notable differences. The customer terminal 400 includes the placard holder 406, which allows an operator to exhibit a placard identifying, for example, the new community, the developer, and/or the sales company. Further, unlike the customer terminal 100, the customer terminal 400 can prompt the customer through audio output (as well as visual output) due to the addition of the speakers 410. Also, while the customer terminal 100 dispenses marketing literature from a customer-inaccessible literature bin to a customer-accessible trough 108, the customer terminal 400 provides customer access to the literature bin via the door 414. The door 414 is controlled by the controller of the customer terminal 400 and only unlocks in response to appropriate input on the keyboard 412.

Additionally, the customer terminal 400 can print material on demand via the printer (which is located inside the customer terminal 400 and not illustrated) and dispense the printed material through the printer slot 416. The printed material may include literature, literature vouchers, and/or commission receipts. For example, when preprinted literature is not available, the printer may print actual literature in full or abbreviated form (such as text-only). Alternatively, when preprinted literature is not available, the printer may print literature vouchers that can be presented to a salesperson in exchange for actual literature. (Commission receipts are explained below in conjunction with FIG. 5.)

The indicator light 420 may be configured to light Up in a first color (e.g., yellow) when the level of literature falls below a certain minimum threshold and a second color (e.g., red) when the literature is completely out. Alternatively, additional indicator lights may be used to indicate low and/or zero quantities of printing paper or ink.

FIG. 5 illustrates a flowchart of a preferred method of operation 500 of the customer terminal 400. The method 500 comprises a number of steps 502-532 (odd numbers excluded). The method 500 begins and proceeds in response to customer input using the keyboard 412. For example, at step 502, the customer may hit the "enter" button on the keyboard 412 in response to an instruction on a "welcome screen" on the display 408. At step 504, a customer or agent may hit the "y" button in response to whether or not he wishes to initiate a transaction.

At step 506, the customer or agent is prompted to identify himself as a customer or agent. If an agent, the method 500 proceeds through a first juncture 508 to step 510, which prompts the agent for agent data. The agent data solicited from, and input by, agents may vary. However, a typical agent data template (e.g., questionnaire) and answers thereto may include the following, and may be displayed in a table on the display 408 as follows:

| DATA TYPE | DATA INPUT |
| --- | --- |
| AGENT NAME | Joe Broker |
| AGENCY | Roe & Doe Real Estate |
| AGENT PHONE NO. | (858) 555-3456 |
| AGENT'S PRINCIPAL | John Customer |
| AGENT'S EMAIL | JOEBROKER@ROEANDDOE.COM |
| TYPE OF REPRESENTATION | Exclusive Agency |
| COMMISSION AMOUNT | 2.5% Of Closing Price |
| HOW DID YOU HEAR ABOUT US? | Internet |

It is to be appreciated that the agent data template and answers thereto outlined in the table above are merely exemplary. A template for soliciting agent data may be custom configured by the operator. For example, the operator can download a custom template from the data center 202 that he previously created and stored to the data center 202. The operator also can modify any template whether using a custom template or a default template.

As mentioned above, the software in the customer terminal 100 is preferably synched with the software in the data center 202 so that when a template is modified on the data center 202, the modification(s) will be effective at the customer terminal 100.

After the agent data is input, the method 500 proceeds to step 512, during which the agent data is recorded to the memory located in the customer terminal 400. Thereafter, in step 514, the agent data is transmitted to the data center 202. In step 516, a commission receipt (not shown) is printed and dispensed through the printer slot 416. The commission receipt preferably includes all of the agent data as well as the date of visit. The commission receipt may be used as evidence that the agent accompanied his customer to the showing and/or of entitlement to a commission if a sale is consummated. After the commission receipt prints, the method 500 proceeds to step 532 and ends.

If a customer is operating the customer terminal 400, the method 500 proceeds through somewhat different steps. At step 506, if the user identifies himself as a customer, the method proceeds through the first juncture 508 to step 518, which prompts the customer for customer data (described above).

After the customer data is input, the method 500 proceeds to step 520, during which the customer data is recorded to the memory located in the customer terminal 400. Thereafter, in step 522, the customer data is transmitted to the data center 202. In step 524, the display 408 asks the customer whether he wants to receive marketing literature. If the customer declines the offer by, for example, pressing button "n" on the keyboard 412, the method 500 proceeds through a second juncture 526 to step 532 and ends.

If the customer accepts the offer by, for example, pressing button "y" on the keyboard 412, the method 500 proceeds through the second juncture 526 to step 528, and the applicable marketing literature is made available through the unlocking of the door 414. The customer can then open the door 414 and retrieve the marketing literature from inside the literature bin.

In step 530, the customer terminal 400 informs the data center 202 that the applicable literature was made available. The method 500 then proceeds to step 532 and ends.

A short lag time after the method 500 ends, step 502 is automatically activated and the "welcome screen" returns to the display 408.

Optionally, if the literature bin is empty, step 528 may entail printing literature, abbreviated literature (such as text only), or a literature voucher. For example, the printer (not shown) located inside the customer terminal 400 can print literature (whether in full or abbreviated form) or literature vouchers and dispense such printed material through the printer slot 416. Literature vouchers may be presented to a salesperson in exchange for actual literature.

After the method 500 ends, the data center 202, automatically sends follow-up emails via the communication link 216 to both the customer and agent soliciting feedback data regarding, for example, the model sales office (or open house), the marketing literature, the properties offered, and/or operation of the customer terminal. The data center 202 is configured to receive the feedback data via the communication link 216 such as through a reply email or an online survey. When the feedback data is received by the data center 202, the data center 202 updates the relevant customer and agent data with the feedback data.

The feedback data, along with the customer and agent data, can be downloaded to, or otherwise accessed by, the business terminals 204, 206, 208, and 210, Thus, salespeople may use the business terminals 204, 206, 208, and 210 to access the feedback data as well as the customer and agent data.

Alternatively, the customer terminal 400 or one of the business terminals 204, 206, 208, and 210 can be configured to send the follow-up emails, receive the feedback data, and/or store the feedback data.

While certain embodiments of the present invention provide on-site access to marketing literature, other embodiments may provide for the distribution of marketing material via other delivery methods, such as by mail and email.

While certain embodiments of the present invention distribute marketing literature, other embodiments may provide for the distribution of marketing material in a digital form such as on a CD or other digital media.

While certain embodiments of the present invention describe a keyboard as an input device, other embodiments may include alternative input devices such as a keypad, touchscreen, mouse, trackball, or microphone.

While certain embodiments of the present invention describe a data center that determines which pieces of marketing literature the customer terminal should disseminate to a customer, other embodiments may include customer terminals that make the determination locally (without instructions from the data center).

While certain embodiments of the present invention describe a system comprising a data center, customer terminal, and business terminal, other embodiments may include dual use terminals that function as both a customer terminal and a business terminal.

While certain embodiments of the present invention describe a system comprising a data center, a customer terminal, and a business terminal, other embodiments may include a single terminal. For example, a single terminal can collect and store customer and agent data, distribute marketing literature, issue literature vouchers, issue commission receipts, and send follow-up emails (if linked to the Internet), as well as provide the stored customer and agent data to a salesperson that subsequently operates the same single terminal.

While certain embodiments of the present invention distribute real estate marketing literature, other embodiments may provide for the distribution of literature regarding other industries or matters.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system for collecting and disseminating data and for distributing literature, the system comprising:
   a customer terminal that collects customer data and issues a literature voucher after said customer terminal collects said customer data, said literature voucher being exchangeable for marketing literature;
   a data center that receives said customer data from said customer terminal and stores said customer data; and
   a business terminal having access to said stored customer data;
   wherein said customer terminal is linked with said data center, and said data center is linked with said business terminal.

2. The system of claim 1, wherein said customer terminal comprises:
an input device for inputting said data; and
a dispensing device that dispenses said literature voucher, said literature voucher being pre-printed.

3. The system of claim 1, wherein said customer terminal comprises:
an input device for inputting said data; and
a printer that prints said literature voucher.

4. The system of claim 1, wherein said customer terminal comprises one of a keyboard, keypad, touch-screen, mouse, trackball, or microphone.

5. The system of claim 1, wherein said business terminal comprises a computer with Internet access.

6. The system of claim 1, wherein said customer terminal and said business terminal comprise a single device.

7. The system of claim 1, wherein said data center sends a follow-up email to an email address collected as part of said customer data.

8. The system of claim 1, wherein said customer terminal collects agent data from an agent and issues a commission receipt to the agent.

9. The system of claim 8, where said data center sends a follow-up email to an email address collected as part of said agent data.

10. The system of claim 1, wherein said literature voucher is issued after at least a portion of said customer data is verified.

11. A system for collecting and disseminating customer and agent data, and sending follow-up emails, the system comprising:
a customer terminal for collecting customer and agent data, said data including at least one of name, contact information, price range, and purchase criteria;
a literature bin for housing literature, said literature bin dispensing said literature after collecting a minimum amount of said customer and agent data;
a data center for receiving said customer and agent data from said customer terminal and for storing said customer and agent data; and
a business terminal for accessing said customer and agent data;
wherein said data center is linked with said customer terminal, said business terminal, and the Internet; and
further wherein one of said customer terminal, data center, and business terminal automatically generates and sends a follow-up email to an email address collected as part of said customer and agent data.

12. The system of claim 11, wherein said literature bin is accessible through a controlled door.

13. The system of claim 11, wherein said business terminal comprises a computer with Internet access.

14. The system of claim 11, wherein said customer terminal and said business terminal comprise a single device.

15. The system of claim 11, wherein said customer terminal further comprises a visual display.

16. The system of claim 11, wherein said customer terminal further comprises a printer for printing one of a commission receipt and literature voucher.

17. The system of claim 11, wherein said customer terminal further comprises a dispenser for dispensing pre-printed literature vouchers.

18. The system of claim 11, wherein said data center receives feedback data in response to said follow-up email and updates said customer and agent data with said feedback data.

19. A method of collecting, disseminating, and following-up on potential home buyer leads and of distributing commission receipts, said method comprising the steps of:
a customer terminal receiving agent data entered via an input device;
said customer terminal transmitting said agent data to a data center;
said data center storing said agent data;
said customer terminal dispensing a commission receipt; and
one of said customer terminal or said data center automatically sending a follow-up email to an email address provided as part of said agent data.

20. The method of claim 19, further comprising: a business terminal accessing said agent data stored at said data center.

21. The method of claim 19, further comprising: said data center receiving feedback data solicited by said follow-up email and updating said agent data stored at said data center.

* * * * *